(12) United States Patent
Grace

(10) Patent No.: US 10,870,961 B1
(45) Date of Patent: Dec. 22, 2020

(54) STORM SURGE AND TSUNAMI MITIGATION BY GENERATION OF OFFSHORE TAYLOR COLUMNS

(71) Applicant: Winston Grace, Tamarac, FL (US)

(72) Inventor: Winston Grace, Tamarac, FL (US)

( * ) Notice: Subject to any disclaimer, the term of this patent is extended or adjusted under 35 U.S.C. 154(b) by 0 days.

(21) Appl. No.: 16/782,403

(22) Filed: Feb. 5, 2020

Related U.S. Application Data

(60) Provisional application No. 62/801,334, filed on Feb. 5, 2019.

(51) Int. Cl.
*E02B 3/06* (2006.01)
*E02B 3/04* (2006.01)
*F03G 7/05* (2006.01)

(52) U.S. Cl.
CPC .............. *E02B 3/062* (2013.01); *E02B 3/04* (2013.01); *F03G 7/05* (2013.01)

(58) Field of Classification Search
CPC ... F03G 7/05; E02B 3/06; E02B 3/062; Y02E 10/34; A01G 15/00; B63B 2035/44
See application file for complete search history.

(56) References Cited

U.S. PATENT DOCUMENTS

| | | | | |
|---|---|---|---|---|
| 3,800,951 A * | 4/1974 | Mourlon | ............... | E02B 15/107 210/242.3 |
| 6,114,773 A * | 9/2000 | Kouris | .................. | F03B 13/105 290/52 |
| 7,862,302 B2 * | 1/2011 | Harman | ............... | B01F 3/04595 416/223 R |
| 10,532,331 B2 * | 1/2020 | Yang | ..................... | B01F 3/0446 |
| 10,550,535 B2 * | 2/2020 | Villar | ........................ | E02B 3/04 |
| 2011/0127022 A1 * | 6/2011 | Eller | .......................... | F03G 7/05 165/168 |
| 2012/0125561 A1 * | 5/2012 | Levings | .................... | F03G 7/05 165/45 |
| 2013/0236248 A1 * | 9/2013 | Cyr | .......................... | E02B 3/04 405/27 |
| 2014/0270963 A1 * | 9/2014 | Lopez | ....................... | E02B 3/06 405/35 |
| 2014/0345696 A1 * | 11/2014 | Harman | .................... | F15D 1/08 137/1 |
| 2018/0327053 A1 * | 11/2018 | Roberts | ................. | B63B 21/502 |
| 2019/0368464 A1 * | 12/2019 | Knotts | .................... | F03B 13/10 |

* cited by examiner

*Primary Examiner* — Carib A Oquendo
(74) *Attorney, Agent, or Firm* — Mark D. Bowen, Esq.; Malin Haley DiMaggio & Bowen, P.A.

(57) ABSTRACT

Offshore apparatus generating artificial Taylor columns for the purpose on interfering with oncoming storm surge and/or tsunamis. A series of solid bodies are anchored relative to the ocean floor to provide structures capable of generating Taylor columns in response to water flow and/or currents. The strategic placement of a series of cylindrical bodies creates a corresponding series of Taylor columns in response to hydrodynamic flow, such as current flow or tsunami related flow. The presence of a series of strategically located Taylor columns is intended to inhibit or disrupt the devastating effects of storm surge and/or tsunamis.

7 Claims, 1 Drawing Sheet

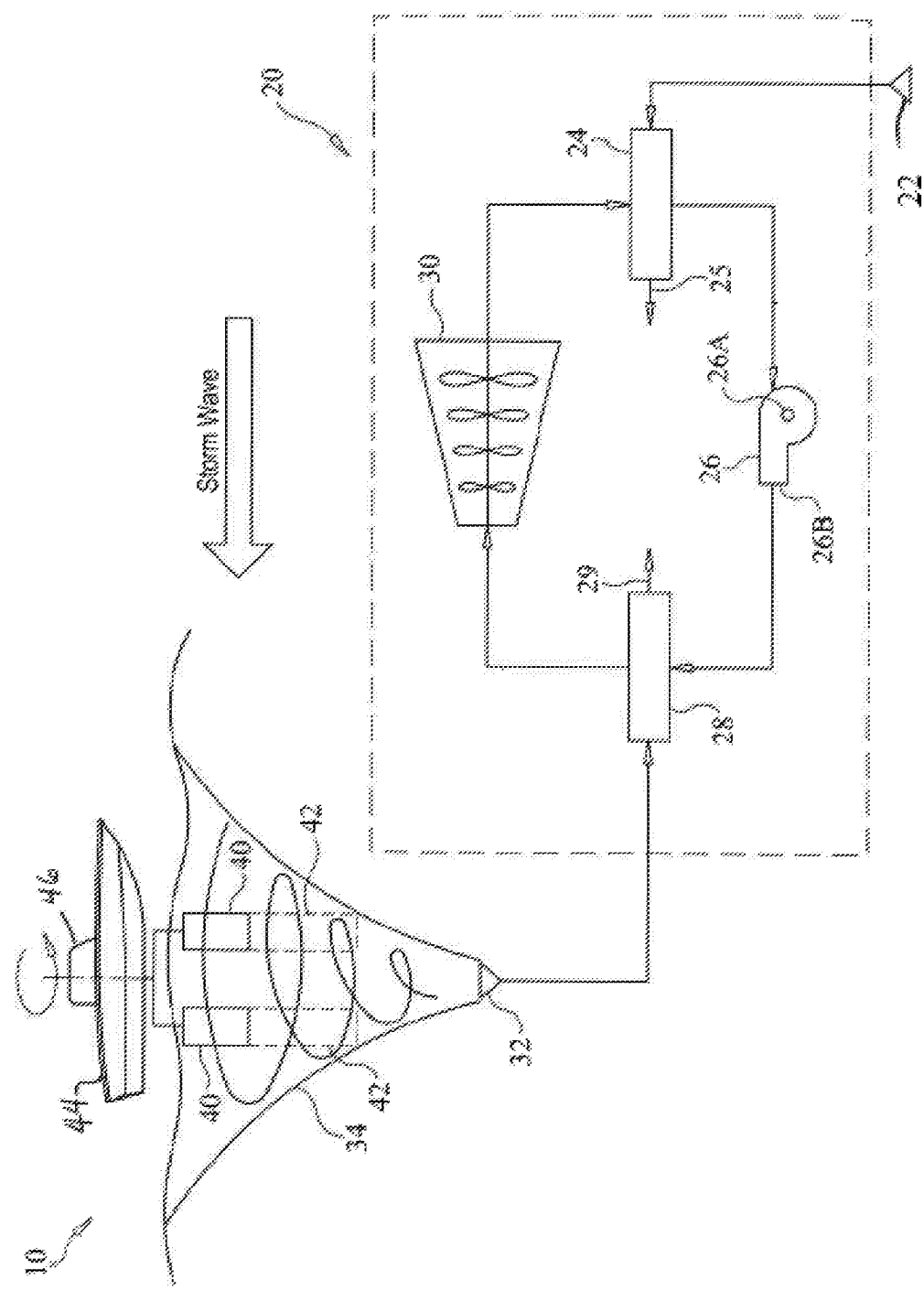

STORM SURGE AND TSUNAMI MITIGATION BY GENERATION OF OFFSHORE TAYLOR COLUMNS

CROSS REFERENCE TO RELATED APPLICATIONS

This application claims the benefit of provisional U.S. Patent Application Ser. No. 62/801,334, filed on Feb. 5, 2019.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to mitigating the devastating effects of storm surge and tsunamis by generating offshore Taylor columns to interfere with and lessen the effects of approaching storm surge or tsunami wave action.

2. Description of Related Art

A Taylor column is a fluid dynamics phenomenon whereby rotating fluids that are perturbed by a solid body tend to form columns (i.e. Taylor columns) parallel to the axis of rotation. With a Taylor column, a slowly moving object (in rotation) behaves nearly as a solid cylinder extended parallel to the rotation axis. An object moving parallel to the axis of rotation in a rotating fluid experiences more drag force than what it would in a non-rotating fluid. Taylor columns thus have the ability to disrupt hydrodynamic flow.

Ocean thermal energy conversion (OTEC) uses the temperature difference between cooler deep and warmer shallow or surface seawaters to run a heat engine and produce useful work, usually in the form of electricity. Warm surface water and cold water obtained at depth are used to as heat exchange media to exchange heat with evaporators and condensers in a vapor compression cycle. OTEC uses the ocean's warm surface water with a temperature of around 25° C. (77° F.) to vaporize a working fluid, which has a low-boiling point, such as ammonia. The vapor expands and spins a turbine coupled to a generator to produce electricity. The bigger the temperature difference, the higher the efficiency of the system.

The damaging effects of storm and tidal surges are well known, as sea waves are capable of damaging coastal communities, battering coastlines, and wearing away infrastructure. Accordingly, there exists a need mitigating the damaging effects of storm and tidal surges. There further exists a need for an offshore system and method for mitigating said effects.

BRIEF SUMMARY OF THE INVENTION

The present invention addresses the needs in the art by providing offshore apparatus for generating artificial, Taylor columns for the purpose on interfering with oncoming storm surge and/or tsunamis. In accordance with the present invention a series of cylindrical solid bodies are installed offshore to provide structures capable of generating Taylor columns in response to water flow and/or currents. The present invention is preferably used in connection with an OTEC system whereby warm water for use by the OTEC system is drawn through an intake disposed in proximity to the cylindrical solid bodies for the purpose of generating a whirlpool capable of generating Taylor columns.

The strategic placement of a series of solid bodies creates a corresponding series of Taylor columns in response to hydrodynamic warm water OTEC inlet flow. The presence of a series of strategically located Taylor columns is intended to inhibit or disrupt the devastating effects of storm surge and/or tsunamis.

Accordingly, it is an object of the present invention to provide advancements directed to mitigating the damaging effects of storm surge and tsunami related surge.

Still another object of the present invention is to mitigate the damaging effects of storm surge and tsunami surge by use of Taylor columns.

Yet another object of the present invention involves the use of Taylor column generating structure in association with OTEC warm water inlet structure for the purpose of storm surge mitigation.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 1 is a schematic illustration of a Taylor column storm surge mitigation system in accordance with the present invention.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Turning now to the drawing, FIG. 1 illustrates a system, generally referenced as 10, for mitigation storm surge and tsunamis by the generation of offshore Taylor columns. As seen in FIG. 1, the present invention works in conjunction with an ocean thermal energy conversion (OTEC) system, generally referenced as 20. Warm surface water and cold water obtained at depth are used to as heat exchange media to exchange heat with evaporators and condensers in a vapor compression cycle. More particularly, OTEC system 20 uses the temperature difference between cooler deep and warmer shallow or surface seawaters to run a heat engine and produce useful work, usually in the form of electricity. A cold-water inlet 22 disposed deep in the ocean draws in cold ocean water. Cold-water inlet 22 is in fluid communication with a refrigerant to ocean water heat exchanger that functions as a condenser 24, through which vaporized ammonia flows while condensing from vapor to liquid. A cold-water outlet 25 discharges ocean water from condenser 24 back into the ocean. A pump 26 has in inlet 26A in fluid communication with condenser 24 and an outlet 26B. Pump outlet 26B is in fluid communication with a refrigerant to ocean water heat exchanger that functions as an evaporator 28, through which liquid ammonia flows while vaporizing. Ammonia vapor passes through a turbine generator 30 wherein expanding ammonia drives the turbine generator to generate electricity. A warm surface water inlet 32 is in fluid communication with evaporator 28. Surface water inlet 32 is vertically disposed in proximity to the ocean surface, and draws in large volumes of warm ocean water with a temperature of approximately 25° C. (77° F.) to vaporize the working fluid, such as ammonia, which has a low-boiling point. The vapor expands and spins a turbine coupled to a generator to produce electricity. The bigger the temperature difference, the higher the efficiency of the system.

A significant aspect of the present invention involves configuring and positioning surface water inlet 32 such that the large volume of water flowing into inlet 32 forms a vortex, generally referenced as 34. More particularly, surface water inlet 32 is configured generally vertically and positioned in proximity to the surface of the ocean, wherein water flowing into the inlet 32 creates hydrodynamic swirling vortex flow 34. The system may be configured with multiple inlets 32 disposed in spaced relation running generally parallel to the shoreline thereby creating a corresponding series of vortex regions. Cylindrical structures, referenced as 40, are installed offshore and positioned within the regions of swirling vortex flow 34 for the purpose of generating artificial Taylor columns, referenced as 42, to interfere with oncoming storm surge and/or tsunamis. The term cylindrical structure should be broadly construed to encompass a disk or cylinder of finite width. Cylindrical structures 40 are formed about a longitudinal axis which is vertically disposed when submerged. As noted above, the formation of Taylor columns requires the interaction between a solid, preferably cylindrical structure, in this case cylindrical structures 40, and hydrodynamic flow, in this case the whirlpool or vortex flow 34.

Cylindrical structures 40 may be maintained in place by a barge 44 or other buoyant or non-buoyant structure. In contemplated alternate embodiments, cylindrical structures may be maintained in place by rigid pilings secured to the ocean floor or any other suitable structure or anchorage system. In addition, cylindrical structures 40 my further be mounted to a mechanism, generally referenced as 46 for moving structures 40 inside artificially generated whirlpool/vortex 34. Mechanism 46 preferably powers rotation of cylindrical structures 40 within whirlpool 34 thereby maximizing the formation of Taylor columns.

The present invention contemplates the offshore installation of a plurality of storm surge mitigation systems disposed in spaced relation generally parallel to the shoreline to be protected from unexpected tsunamis or storm driven storm surge. By forming a line of Taylor columns, the present invention functions to disrupt and/or mitigate storm surge and tsunami wave action before it reaches shore.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for mitigating the effects of storm surge and tsunamis on a coastal area, said system comprising:
   a submerged cylindrical body disposed offshore from the coastal area, said cylindrical body formed about a longitudinal axis which is vertically disposed;
   means for forming a whirlpool in proximity to said submerged cylindrical body, said means for forming a whirlpool includes an OTEC system having a warm water inlet disposed beneath said cylindrical body creating a swirling vortex flow;
   whereby a Taylor column is formed from hydrodynamic interaction between said submerged cylindrical body and said whirlpool to mitigate effects of storm surge and tsunami.

2. The system according to claim 1 further including a second submerged cylindrical body disposed formed about a longitudinal axis which is vertically disposed and laterally offset from said first submerged cylindrical body.

3. The system according to claim 1 further including a rotational mechanism rotating both of said submerged cylindrical bodies about a common axis of rotation.

4. A system for mitigating the effects of storm surge and tsunamis on a coastal area, said system comprising:
   first and second submerged cylindrical bodies disposed in laterally offset relation offshore from the coastal area, each of said cylindrical bodies formed about a longitudinal axis which is vertically disposed;
   an OTEC system having a warm water inlet disposed beneath said cylindrical bodies;
   said warm water inlet forming a whirlpool in surrounding relation with said submerged cylindrical bodies;
   whereby Taylor columns are formed from hydrodynamic interaction between said submerged cylindrical body and said whirlpool, whereby the effects of storm surge and tsunami may be mitigated.

5. The system of claim 4 further including a rotational mechanism for rotating both of said submerged cylindrical bodies about a common axis of rotation.

6. The system of claim 4 further including means for maintaining said submerged cylindrical bodies at a fixed location.

7. The system of claim 6 wherein said means for maintaining said submerged cylindrical bodies comprise a barge.

* * * * *